(12) United States Patent
Huang et al.

(10) Patent No.: US 8,682,111 B2
(45) Date of Patent: Mar. 25, 2014

(54) 2D RINGING AND OVERSHOOT CONTROL IN IMAGE RESCALING

(75) Inventors: Yong Huang, Singapore (SG); Lucas Hui, Braddell View (SG)

(73) Assignee: STMicroelectronics Asia Pacific Pte, Ltd, Singapore (SG)

( * ) Notice: Subject to any disclaimer, the term of this patent is extended or adjusted under 35 U.S.C. 154(b) by 0 days.

(21) Appl. No.: 13/489,240

(22) Filed: Jun. 5, 2012

(65) Prior Publication Data

US 2013/0322784 A1    Dec. 5, 2013

(51) Int. Cl.
*G06K 9/32* (2006.01)

(52) U.S. Cl.
USPC .......................................... 382/300; 382/298

(58) Field of Classification Search
USPC ................. 382/300, 128, 162, 232, 245, 298; 356/318, 338; 348/265, 271; 345/611, 345/660; 358/505, 1.9; 436/164, 518, 426, 436/317; 604/1
See application file for complete search history.

(56) References Cited

U.S. PATENT DOCUMENTS

| | | | | |
|---|---|---|---|---|
| 6,005,979 | A * | 12/1999 | Chang et al. | 382/232 |
| 7,803,633 | B2 * | 9/2010 | Spivey et al. | 436/164 |
| 8,213,710 | B2 * | 7/2012 | Dosluoglu | 382/162 |
| 8,229,212 | B2 * | 7/2012 | Siddiqui et al. | 382/162 |
| 2011/0298972 | A1 | 12/2011 | Huang | |

* cited by examiner

*Primary Examiner* — Anh Do
(74) *Attorney, Agent, or Firm* — Hogan Lovells US LLP

(57) ABSTRACT

The methods and systems of this invention allow for independent adaptive control of ringing and overshoot effects in 2-dimensional array interpolation processes, including in image and video rescaling and analysis. The methods and systems can use either a column-wise or a row-wise interpolation, or a combination thereof. Each uses a respective preliminary interpolation of data, followed by ringing and/or overshoot control. Controllable parameters allow variability in the amount of ringing and/or overshoot retained in the interpolated data. The ringing and overshoot controls apply a local analysis of the data to adjust the preliminary interpolation results. The methods may be repeated iteratively, for example, to obtain a desired rescaling of an image data array.

27 Claims, 12 Drawing Sheets

2D ADAPTIVE RINGING CONTROL

2D INPUT DATA FOR INTERPOLATION AND RINGING
AND OVERSHOOT CONTROL: ROW-WISE INTERPOLATION STAGE

RELATIVE INDEXING

OUTPUT OF 2D DATA ANALYSIS

2D DATA USED IN 2D LOCAL FREQUENCY ANALYSIS

2D RINGING AND OVERSHOOT CONTROL IN IMAGE RESCALING

RELATED APPLICATIONS

The present invention is related to the subject matter disclosed in U.S. patent application Ser. No. 12/802,382 for: "System and Process for Image Resealing Using Adaptive Interpolation Kernel with Sharpness and De-Ringing Control" assigned to the assignee hereof and filed on Jun. 4, 2010, the disclosure of which is herein specifically incorporated by this reference in its entirety.

BACKGROUND OF THE INVENTION

1. Field of the Invention

The present invention relates, in general, to the field of 2-dimensional (2D) data analysis, interpolation and filtering, and to video and image processing. More specifically, it pertains to image rescaling and interpolation. It has uses in television (TV) and set-top box (STB) products and applications, among others. It can also be applied to rescaling of color graphs of functions of two variables. Other applications will be apparent to those of ordinary skill in the art.

2. Relevant Background

Digital signal processing is often applied to sampled phenomena, whether 1-dimensional (1D) data (such as voltages) or 2D (such as pixel values of gray scale or color images). The general processes for data modification (for example: noise removal, data compression, edge detection, rescaling, interpolation, etc.) often involve filtering (mathematically, local weighted averages, i.e. convolution with an appropriate kernel), interpolation (inferring unknown function values at inputs between two existing input values), and other operations.

In the particular application of image rescaling (typically enlargement of some or all of the image, but also compression), several methods of interpolation are well known in the art: nearest neighbor (level step) interpolation, bilinear, bicubic, and hqx families, among others.

When filtering or interpolating data, discontinuities in the data can produce the spurious phenomena of ringing, i.e. oscillations of output values around the true or desired values, and overshoot, i.e. output values beyond the maxima/minima of the true or desired values. A well-known example of this is the Gibb's phenomena at a step discontinuity of 1D data.

In high quality image rescaling, ringing and overshoot effects are typically created by using multi-tap interpolation kernels. In some cases, ringing and overshoot are good for resealed image results, e.g. high frequency reconstruction. In other cases, these artifacts should be avoided, e.g. ringing and overshoot effects along clear and sharp edges can be disadvantageous.

Many current methods of image interpolation often involve just 1D interpolation methods applied on a row-by-row (or column-by-column) basis to the image data, which often can create "staircase" artifacts. Further, current 2D methods do not allow for user controlled variation in the amount of ringing and/or overshoot that is kept in the image.

So, independent controllability of ringing and overshoot effects is advantageous in high quality image rescaling. Especially important is that such controllability be computationally efficient. Finally, the two dimensionality implicit in image data should be taken into account during image processing.

SUMMARY OF THE INVENTION

The present invention is directed to methods and systems for controlling ringing and overshoot effects in 2D data interpolation or processing, for example, in image analysis and rescaling. The present invention allows these artifacts to be controlled independently and separately if desired, or for the simultaneous control of both. The invention can be applied to gray scale image data, color image data, and to any 2D array of data, in which the array's values represent a physical quantity for which a user may wish to have interpolating values, of some or all of the array data. Other applications will be clear to a person of ordinary skill in the art.

One embodiment of the method for the control of both ringing and overshoot artifacts is accomplished, in the exemplary case of image enlargement, in two steps. The first step of the method comprises an array initiation process, which in turn may comprise many straightforward operations, including accessing the desired part (including the case of all) of an original data array to be the input array, transposing the orientation of the input array, expanding the input array by 0-padding, or by extrapolating edge values, or by using any data extension method known in the art, if needed for later processing stages in the method, and determining the locations in the array at which interpolation values are to be calculated. A part of this first step is also accessing or obtaining a plurality of the input control parameters $S_{offset}$, $K_{ring}$ $KT_o$, $K_{ovs}$.

The second step of the method is the application of either a one-stage or a two-stage interpolation process. Note that interpolation means the creation of new values at interpolation locations, i.e. at locations between selected adjacent pairs of points in an array. A one-stage interpolation process is used, for example, when it is only necessary to enlarge in one direction. One stage (row-wise) is also used in chroma format conversion. In one embodiment of the two-stage interpolation process, the column data of the input array is first interpolated, using the ringing and/or overshoot control processes described below, to create a new, intermediate array; then in the second stage the row data of all the rows of the intermediate array is interpolated, also by using the ringing and/or overshoot control processes, to create the final output array. In another embodiment of the two-stage process, in the first stage the rows of the input array are first interpolated by the ringing and/or overshoot control processes to create the intermediate array, with the columns of the intermediate array interpolated in the second stage.

In the one-stage interpolation stage embodiment, either just the column data is interpolated, using the ringing and/or overshoot control processes, or else just the row data is interpolated. Such a one-stage process for the second step can occur if the data only needs to be resealed in one direction.

In one embodiment, in the second step, the method first applies an Adaptive Ringing Control process, followed by an Adaptive Overshoot Control process. In the current invention, each of these processes has user adjustable parameters which can vary the amount, respectively, of ringing and overshoot artifacts removed. Under some settings of the respective parameters, no ringing control or no overshoot control occurs. This allows for circumstances where these artifacts aid the visual quality of resealed image data.

In an alternate embodiment of the current invention, the method only applies the Adaptive Ringing Control process in a given interpolation stage of the system. In another embodiment, only the Adaptive Overshoot Control process is used in a given interpolation stage of the system.

The invention's Adaptive Ringing Control process uses preliminary interpolation values from a multi-tap interpolation filter applied to the array data. The multi-tap interpolation filter can be any standard 1-dimensional interpolation filter, such as a polyphase filter, triangle filter, Hanning filter, Hamming filter, or other filter known to one of ordinary skill in the art. In alternate embodiments, it can be based on a 2D interpolation filter using input array values from columns and rows other than those of the interpolation location. However, as these filters may not achieve the desired ringing artifact control, the values they produce are used in conjunction with the input array's values and user-controlled parameter values to calculate, as detailed below, the Ringing Control's output value for an interpolation location.

In one embodiment, the Adaptive Overshoot Control process uses the output values from the Adaptive Ringing Control, together with the input array's values and a user-controlled parameter, to calculate the final interpolation value for an interpolation location. In the embodiment in which only the Adaptive Overshoot Control is to be used, the Adaptive Overshoot Control process uses the outputs of a multi-tap interpolation filter, as described in the previous paragraph, in lieu of the outputs of the Adaptive Ringing Control Process, together with the input array's values and a user-controlled parameter, to calculate the final interpolation value for an interpolation location.

In another embodiment of the invention, the methods described above can then be applied iteratively to achieve a desired level of enlargement. For compression, interpolation values are not produced at every possible interpolation location, i.e. not between every adjacent pair of points in a row or column, but only at a fraction needed to achieve a desired image compression. For example, interpolation values may be calculated only between every other pair of adjacent data locations.

In other embodiments of the invention, the interpolation process is a one-stage process applied to rows of the input array, but the process is then repeated iteratively to the combined array comprising the initial input data array and the interpolation values. By also transposing the combined array before the second iteration, the second one-stage interpolation achieves the same net result as the two-stage interpolation process discussed above. Further, when the one-stage interpolation process is applied iteratively, it is possible to change which of the 2D Adaptive Ringing Control and the 2D Adaptive Overshoot Control processes are implemented in each iteration, in order to achieve a variety of possible end results.

BRIEF DESCRIPTION OF THE DRAWINGS

The detailed description references the accompanying figures. In the figures, the digit(s) to the left of the two right-most digits of a reference number identify the number of the figure in which the reference number first appears. The same numbers are used throughout the drawings to reference like features and components.

DETAILED DESCRIPTION

In the present document, the word "exemplary" is used to mean "serving as an example, instance or illustration, and is not construed as limiting." Any embodiment or implementation of the present subject matter described herein as "exemplary" is not necessarily to be construed as preferred or advantageous over other embodiments.

The present invention gives methods and systems for the independent and adaptive control of ringing and overshoot effects in 2-dimensional (2D) data array that may occur during interpolation, resealing, or other analysis processes. The adaptive control arises from tunable, user-adjustable parameters. In some settings of the parameters the respective control can be stopped, and the data remains as it was input.

It is well known that any data is usually stored sequentially in most physical devices, such as tape drives, random access memory, internal processor cache, etc. To speak of a data array as being 2-dimensional herein means that the data values are treated as if they were part of a rectangular matrix, i.e. have both a row and column location.

Figure 1:
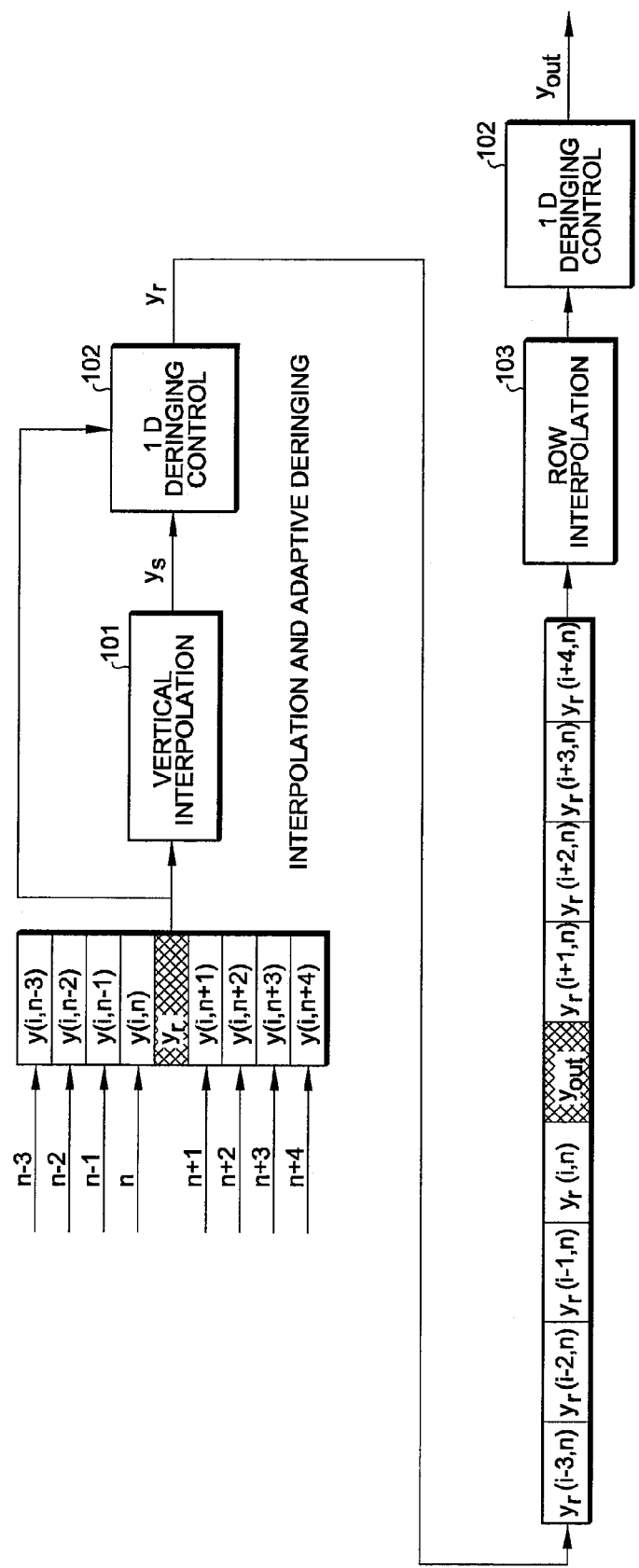
FIG. 1 shows the two-stage structure of a current art, 1-dimensional (1D) based, Interpolation and Adaptive Deringing Control process for image data showing the case in which column interpolation 101 is performed first, followed by an Adaptive Deringing Control 102 to produce an intermediate (column) interpolation value $y_r$. The same 2-step Interpolation and Adaptive Deringing Control is then applied horizontally (i.e. across a row of data) to the resulting array of $y_r$ values to produce the final interpolation result, $y_{out}$. The interpolation process 101 can be a known prior art process for interpolation.

For purposes of comparison and contrast with the invention herein, a current art solution, which can only control ringing effects, is shown in FIG. 1. The data to be processed is a 2D data array. This solution comprises first calculating, at each interpolation location between each column-wise adjacent pair of points in the original array, a preliminary interpolation value $y_s$ using an 8-tap filter, shown as Column-wise Interpolation 101, applied to the original data, column-wise symmetrically about the interpolation location. The value $y_s$ is used together with a 1D Deringing Control 102 to create a column-wise interpolation value, denoted $y_r$. The original input array thereafter has more rows since the $y_r$ values have been inserted vertically. In the second stage of the process, the expanded array has applied to it the row-wise equivalent interpolation process. The Row-wise Interpolation 103 applies the same 8-tap interpolation process, only across the data array, to create preliminary interpolation estimates at each interpolation location between each horizontally adjacent pair of points in the $y_r$ array, and these estimates are then used with the 1D Deringing Control 102 to create the next row-wise interpolation values, $y_{out}$, within the $y_r$ array.

Figure 2:
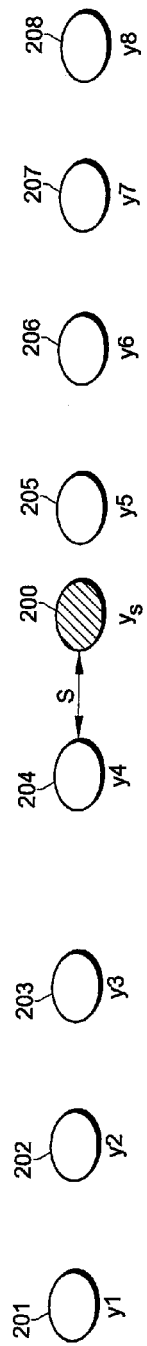
FIG. 2 shows the relative indexing for the 8 data points, 201 through 208, used to obtain the interpolated value $y_s$, 200, in the current art 1D Deringing Control, 102.

The 8 data points, 201 through 208, used to create an interpolated value, either $y_s$, $y_r$ or $y_{out}$, in either an Interpolation or in the 1D Deringing Control process 102 are shown in FIG. 2 with relative indexing. Though shown horizontally, one of ordinary skill in the art would be able to adjust for the case of column-wise interpolation.

Figure 3:
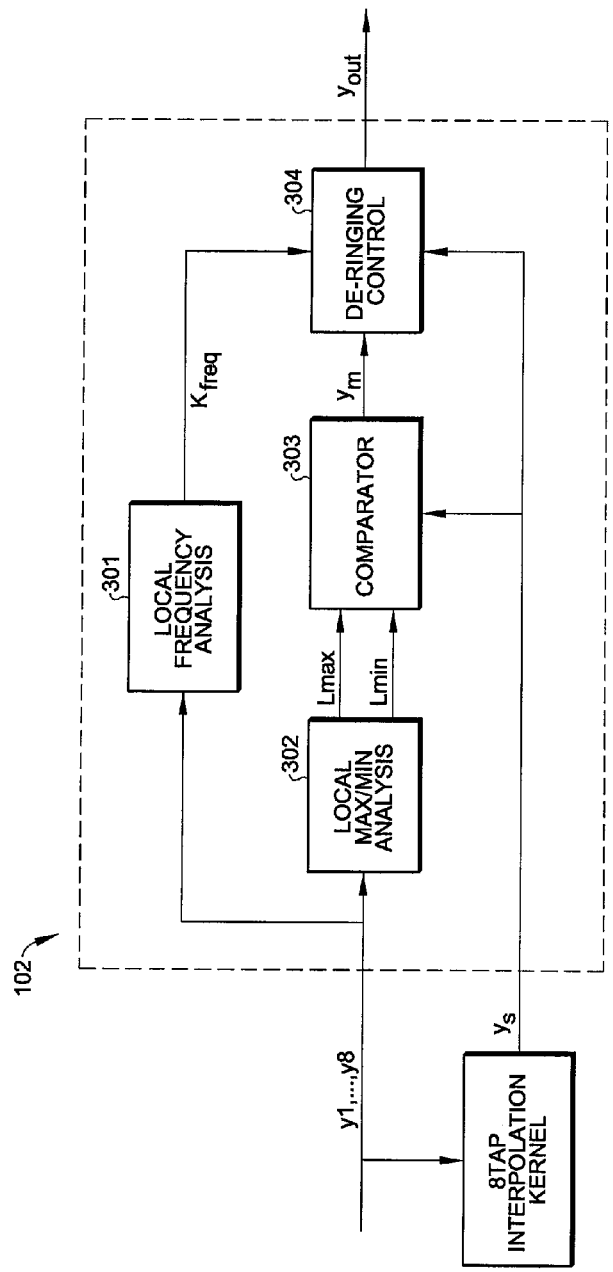
FIG. 3 shows the details of the 1D Deringing Control 102. It comprises: a local Frequency Analysis module, 301; a 1D Local Max/min Analysis module, 302; a Comparator, 303; and a Deringing Control module, 304. Note that the initial interpolation values $y_s$ are used by both in the internal comparator and Deringing control modules. Further details can be found in the U.S. Patent Application Publication No. US 2011/0298972. This figure is included as an illustration of prior art solutions, and for comparison with the invention described herein.

The details of the 1D Deringing Control are illustrated in FIG. 3. A 1D Local Max/min Analysis 302 calculates two values: Lmax=max(y4,y5) and Lmin=min(y4,y5).

The 1D Local Frequency Analysis 301 performs the calculations:

$$K\text{freq}=\min(dev1,dev2,dev3,dev4)/N$$

where $$dev1=\max(|y_1-2\times y_2+y_3|,|y_2-2\times y_3+y_4|)$$

$$dev2=\max(|y_3-2\times y_4+y_5|,|y_4-2\times y_5+y_6|)$$

$$dev3=\max(|y_5-2\times y_6+y_7|,|y_6-2\times y_7+y_8|)$$

$$dev4=\min(|y_2-y_4|,|y_3-y_5|)$$

and N is a constant value used to normalize $K_{freq}$ so that $K_{freq}$ is in the range [0, 1].

The Comparator 303 calculates its output, $y_m$, by:

$$y_m = \begin{cases} L\max & \text{if } (y_s > L\max) \\ L\min & \text{if } (y_s < L\min) \\ y_s & \text{else} \end{cases}$$

Finally, the Deringing Control calculates the interpolation value $y_{out}$ by $$y_{out}=K\text{freq}\times(y_s-y_m)+y_m$$

Figure 4:
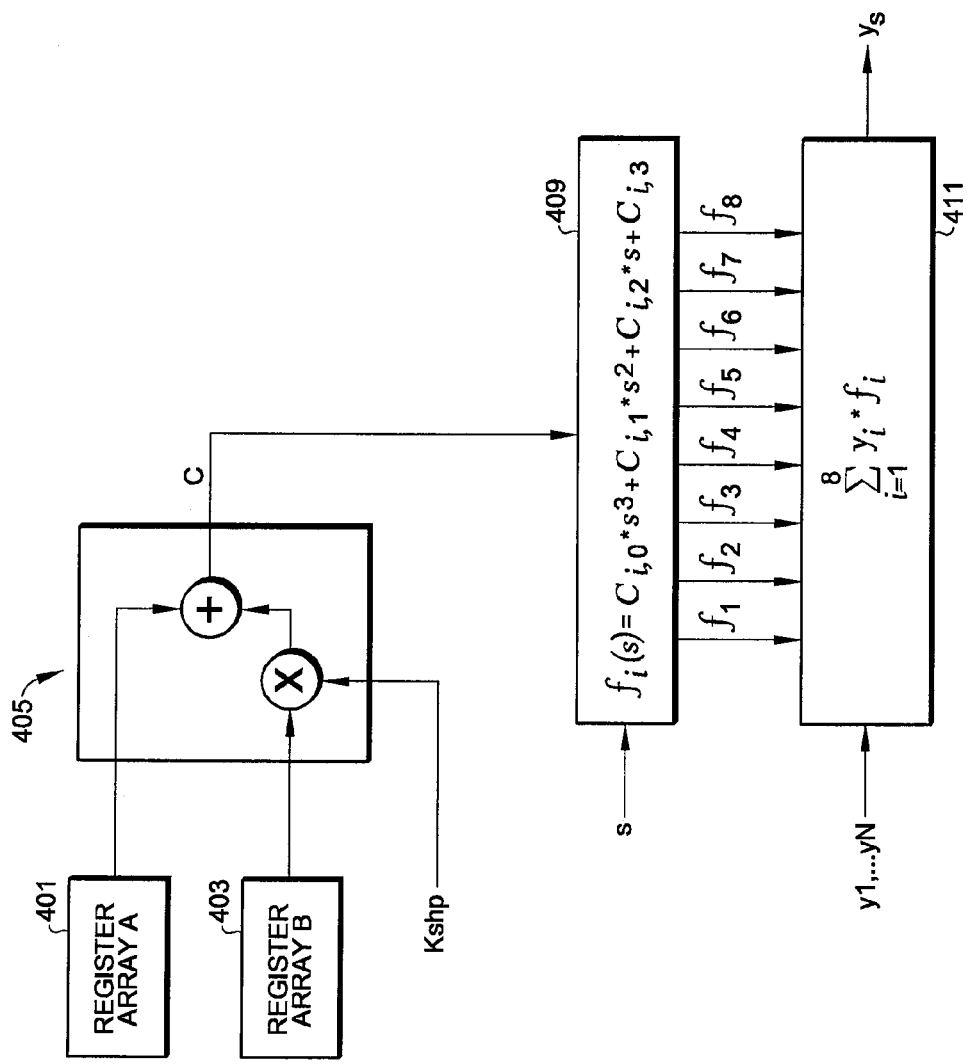
FIG. 4 shows details of the interpolation blocks 101 and 103.

FIG. 4 shows the details of the interpolation process used in the prior art. It uses 8 coefficients $f_j$ for j=1 . . . 8, in the embodiment shown. Constants, A and B, are respectively stored in memory registers 401 and 403. The combining block 405 calculates the value of C by C=A+Kshp*B, where Kshp is a constant used to control sharpness. The constant C is used by the unit 409 to calculate the 8 coefficients, which are then applied to the input variables y1, . . . yN by a standard multiply-accumulate operation 411 to produce $y_s$.

The current art solution of FIG. 1 has no method for the control of overshoot effects. Further, there is no process for varying the amount of deringing control. As mentioned, separate control of ringing and overshoot effects is sometimes advantageous, along with variability in the control applied. The current invention addresses these issues.

The embodiments of the invention disclosed herein may, as necessary, begin with an initiation step, comprising various standard array operations. The first of such array operations simply is accessing a part (including the case of all) of an original 2D data array as the input array for the entire process. There are many ways to implement accessing the desired part of the data array, including but not limited to (e.g. in computer hardware or software) passing (or being passed) copies of the array, or passing (or being passed) storage address information about where the data array is stored, or others known in the art. An optional operation is to enlarge, or otherwise prepare, the desired array part, for subsequent calculations by 0-padding the boundaries, extending the array data, or by any other preparation method known in the art. Another operation for the first step is obtaining interpolation location information. This need not be explicit, for example, when the invention is being used to implement an enlargement of image data, the interpolation locations may be understood to be between every adjacent pair of array locations. But in other cases, for example image compression, the invention's methods and systems may receive the interpolation locations as an input, or may infer them from other inputs. All these possible operations for the first step are known to those of ordinary skill in the art. The result is termed the initial input data array.

A part of this first step is also accessing, as described above, a plurality of the input control parameters $S_{offset}$, $K_{ring}$, $KT_o$, $K_{ovs}$.

One embodiment of the invention follows the initiation step with an interpolation step, applied to the initial input data array, which comprises a two-stage process. In the first stage, column-wise interpolation is applied, as detailed below, creating interpolation values at specified interpolation locations between column-wise adjacent pairs of values in the data array. For image enlargement, in one embodiment the specified interpolation locations are between every pair of column-wise adjacent values in the data array. In alternate embodiments, especially for image compression, the method may be configured so that the column-wise interpolation need not create interpolation values for every column-wise adjacent pair of values, nor between any padded or extended array values, which may have been added during a preliminary stage. In the second stage, row-wise interpolation is applied, as detailed below, creating interpolation values at specified interpolation locations between row-wise adjacent pairs of values in the data array. Just as for column-wise interpolation, the specified interpolation locations for the row-wise stage may be either between every row-wise adjacent pair, or only at a selected subset.

Figure 8:
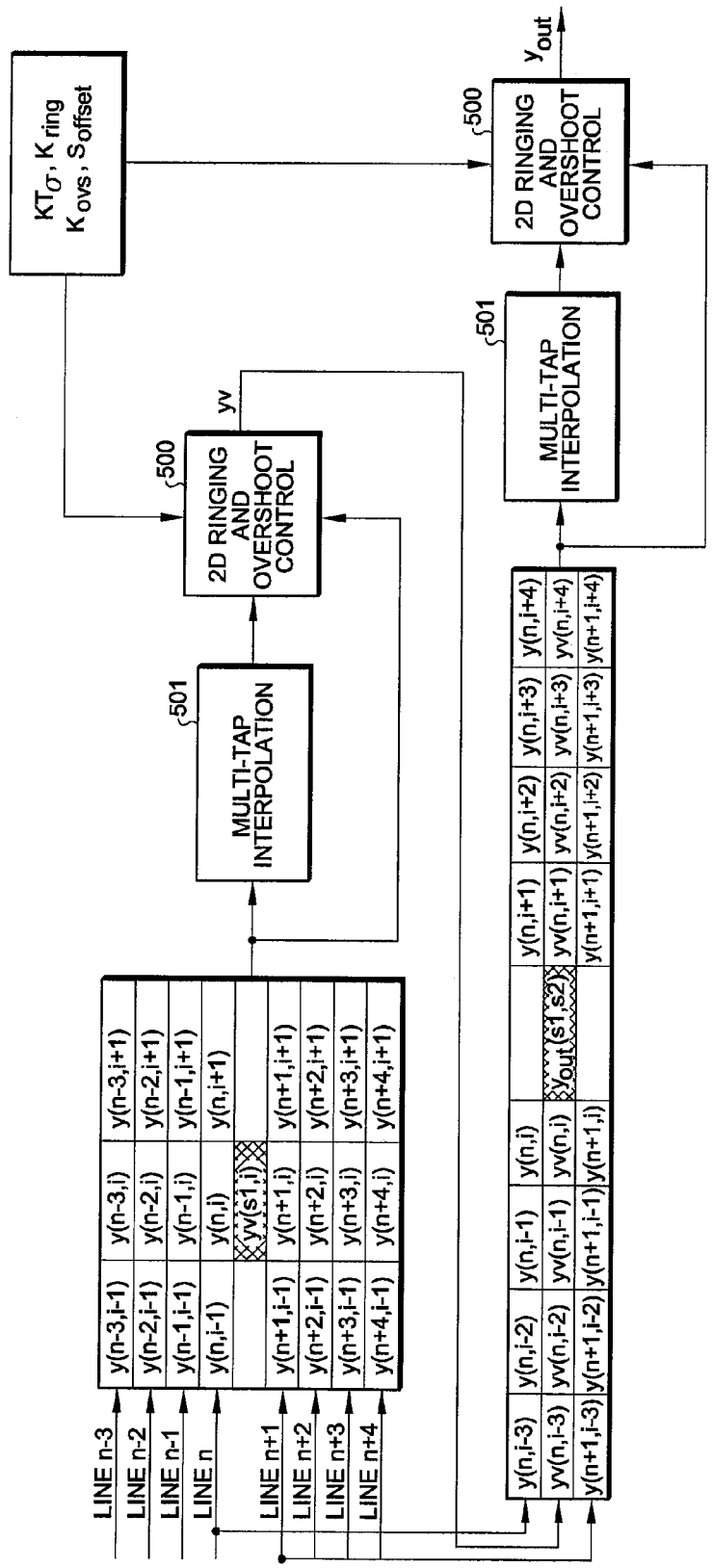
FIG. 8 shows the overall data flow used in an embodiment of the invention, in which column-wise interpolation and 2D Deringing and Overshoot control are performed first, followed by row-wise interpolation, with further 2D Deringing and Overshoot control.

In an alternate embodiment for the method of the previous paragraph, the two interpolation stages are performed in reverse order: with row-wise interpolation first, followed by column-wise interpolation. Whichever stage is applied first to the initial input data array produces a new array of the interpolated data values. This new array may be combined with the original array to produce the input array to the next stage. The overall flow of the data is shown in FIG. 8, in the particular embodiment that the column-wise interpolation stage is applied first, followed by the row-wise interpolation stage. In the particular embodiment shown therein, the column-wise interpolation calculates the first interpolation values, yv, using neighboring values from the original input data array. Once such yv values have been calculated, in this exemplary case between every column-wise adjacent pair of the initial input data array, an expanded array is created, by combining the rows of the original input array alternately with new rows of the yv values. This expanded array is then used as the input array for the second, row-wise interpolation process, in which final interpolation values, $y_{out}$, are calculated between (in this example) every pair of row-wise adjacent locations of the array.

Figure 5:
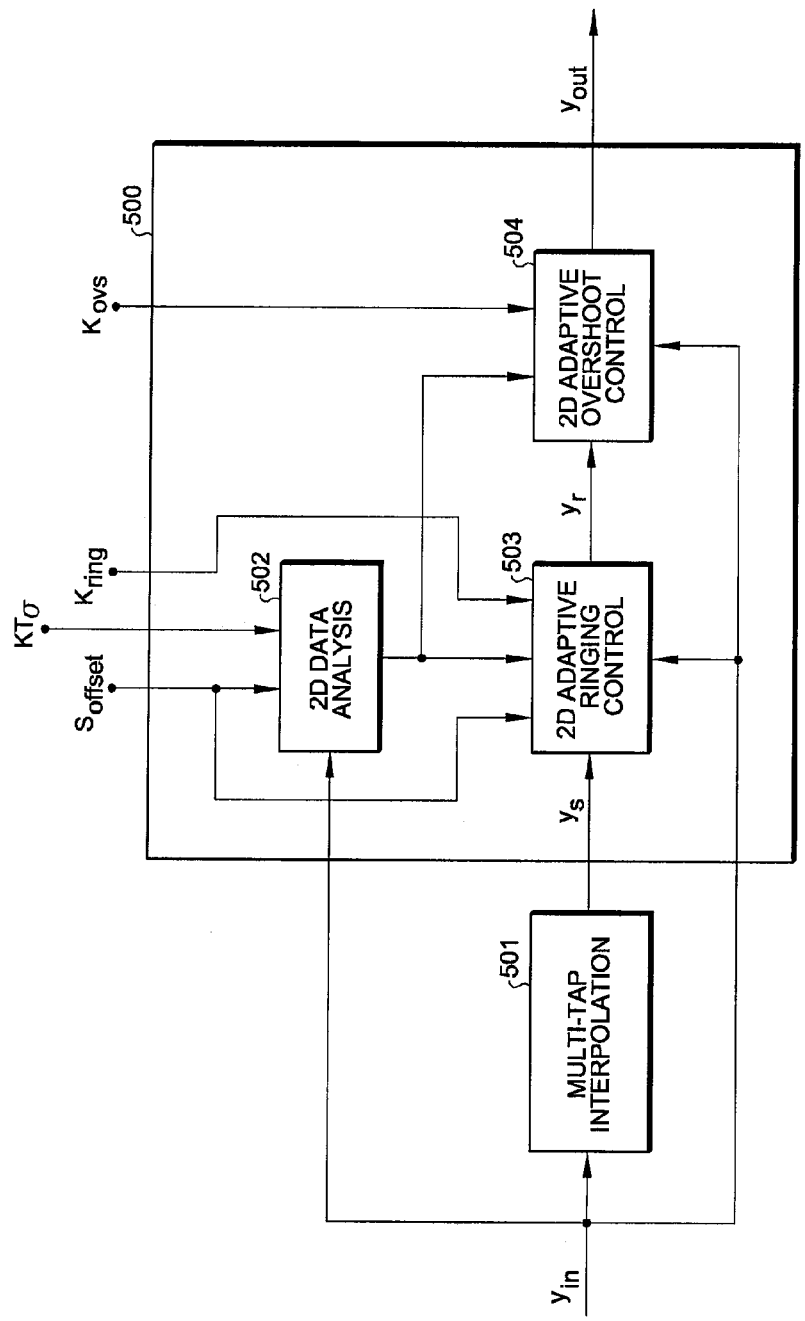
FIG. 5 shows an embodiment of the present invention for adaptive control of both ringing and overshoot of one stage (either column-wise or row-wise) of the method. The process includes a multi-tap interpolation 501, followed by the process of block 500 to implement control of ringing and overshoot. User controlled inputs $S_{offset}$, $KT_\sigma$, $K_{ring}$, and $K_{ovs}$ are shown being applied.
Figure 12:
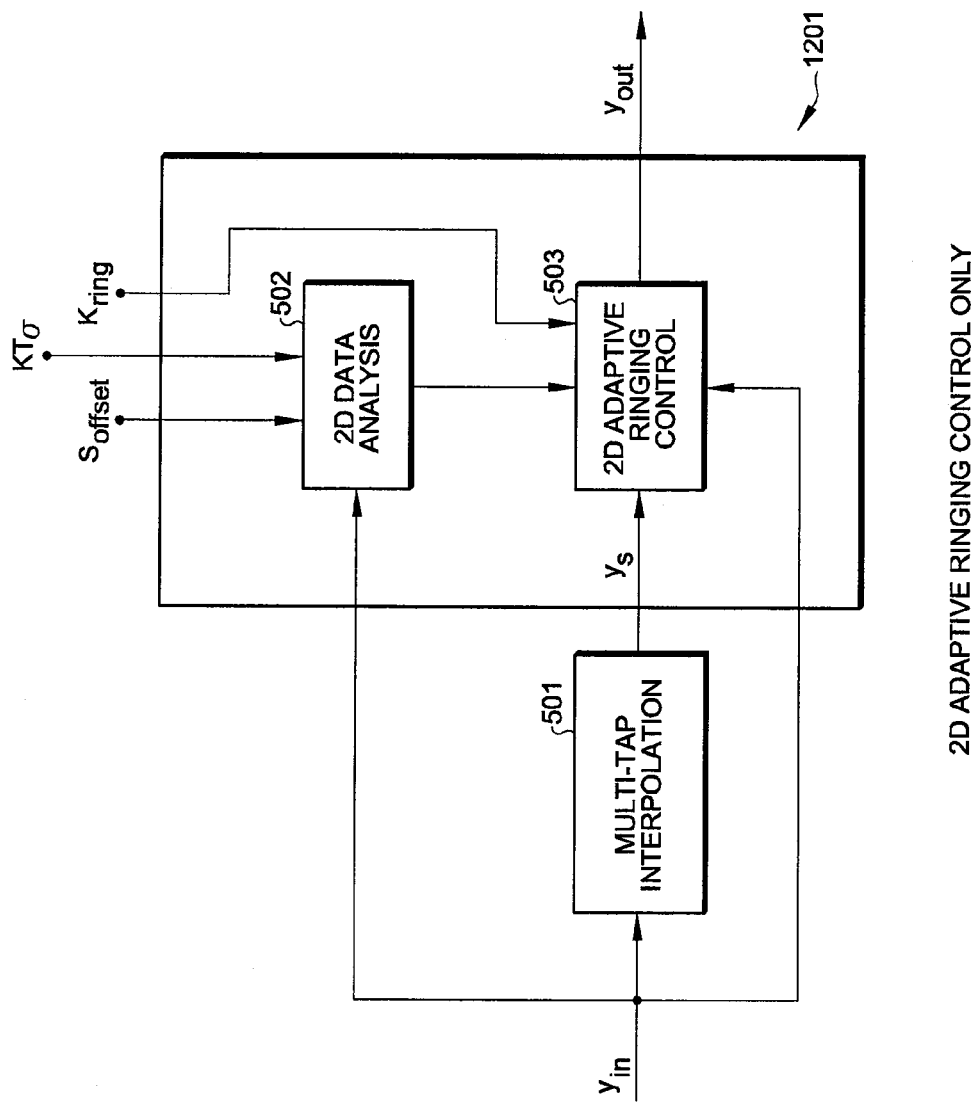
FIG. 12 shows the structure of one stage of interpolation implementing only 2D Adaptive ringing control.
Figure 13:
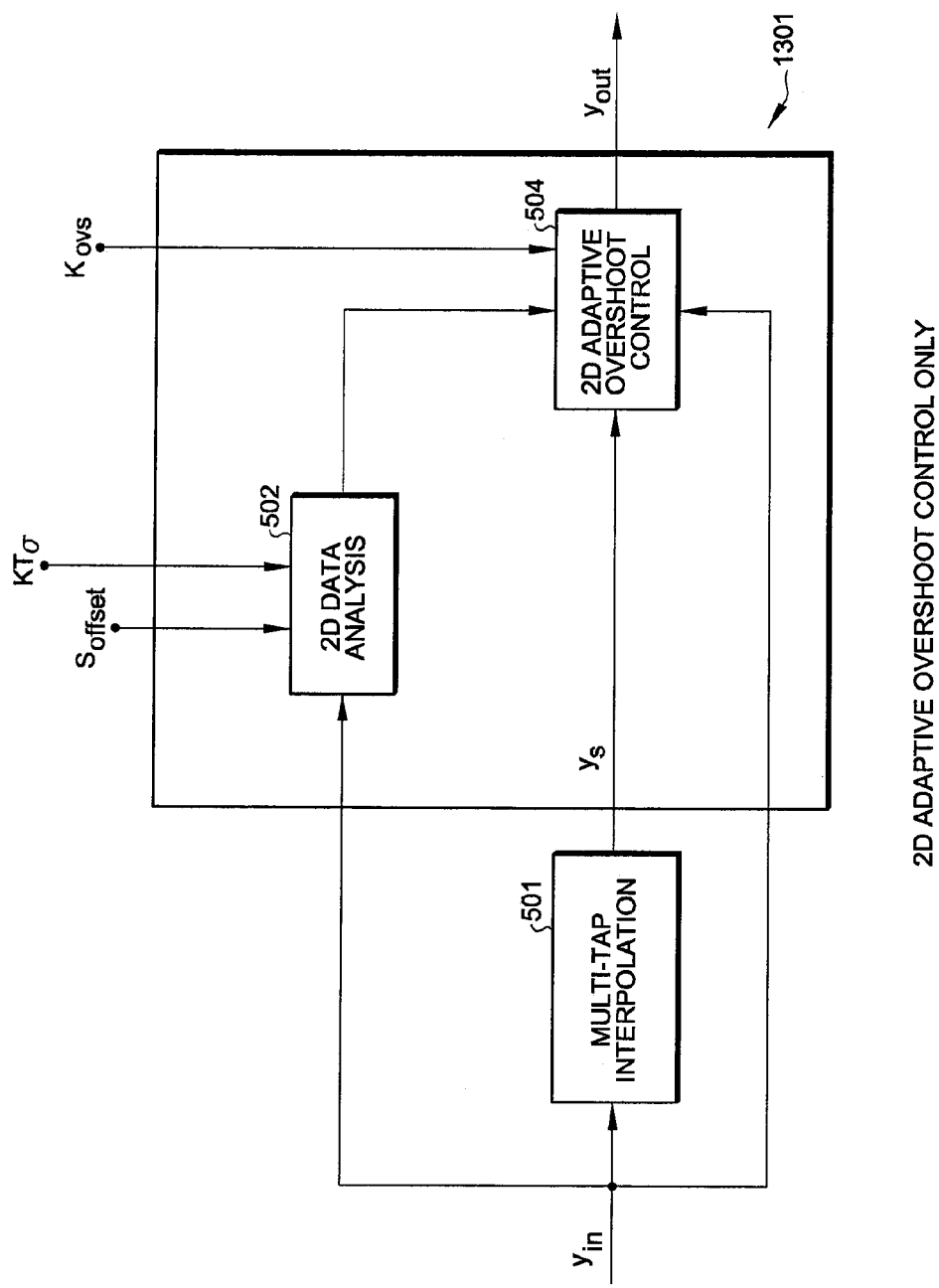
FIG. 13 shows the structure of one stage of interpolation implementing only 2D Adaptive overshoot control.

Each stage itself is comprised of two substages: a preliminary Multi-tap Interpolation 501, followed by a second substage, in one of three alternative embodiments: by either a dual Adaptive Control process, 500, as shown in FIG. 5, for both ringing and overshoot control; by just an Adaptive Ringing Control process 1201, shown in FIG. 12; or by just an Adaptive Overshoot Control process 1301, shown in FIG. 13.

The Multi-tap Interpolation substage 501 uses an N-tap filter to produce, at each interpolation location, a preliminary estimate $y_s$ for that location's interpolation value. In an exemplary, simple embodiment, the particular filter creates array entries $y_s$ by the rule for a rectangular window, applied to array data points in the column (for the column-wise interpolation stage) containing the $y_s$ location.

$$y_s(n, i) = \frac{1}{N} \sum_{k=n-\frac{N}{2}+1}^{n+\frac{N}{2}} y_{in}(k, i)$$

In other embodiments the Multi-tap Interpolation substage 501 can use other weightings of the array data to calculate $y_s$ at each location, such as triangle windows, Hanning or Hamming windows, raised cosine, or other filters as known in the art. More generally the filter is polyphase filter:

$$y_s(n, i) = \sum_{k=m+N/2}^{m-\frac{N}{2}+1} f(s; m-k+N/2) * y_{in}(k, i) =$$

$$f(s; 0) * y_{in}\left(m - \frac{N}{2} + 1, i\right) + \ldots + f(s; N-1) * y_{in}\left(m + \frac{N}{2}, i\right).$$

The tap weights f(s; 1) are adjustable depending on the interpolation phase "s," and may be further adjusted depending on the interpolation location, such as near an edge value of the 2D array.

In still further embodiments, the Multi-tap Interpolation substage 501 can use a 2-dimensional subarray of its input array data, about the interpolation location, comprising a plurality of rows and columns, as is known in the art.

FIG. 5 shows an embodiment of the second substage 500 for independent 2D Adaptive Control of both ringing and overshoot. In FIG. 5, $y_{in}$ may be just the initial input data array to a first interpolation stage, or it may an expanded array from a previous interpolation stage. The dual Adaptive Control 500 uses the results of the Multi-tap Interpolation 501, together with the values $y_{in}$ of the array itself, and four adjustable parameters, $S_{offset}$, $K_{ring}$, $KT_\sigma$, and $K_{ovs}$, to create the final output interpolation value, $y_{out}$. The four adjustable parameters may be used as desired to vary the control of the ringing and overshoot effects. Note that $y_{out}$ in FIG. 5 is the output of either the column-wise stage, or of the row-wise stage. In the embodiment of FIG. 5 there are three processes used to create $y_{out}$: a 2D Data Analysis operation 502, a 2D Adaptive Ringing Control process 503, and a 2D Adaptive Overshoot Control process 504. For simplicity of notation, hereafter $y_{in}$ will sometimes just be denoted by y.

Figure 9:
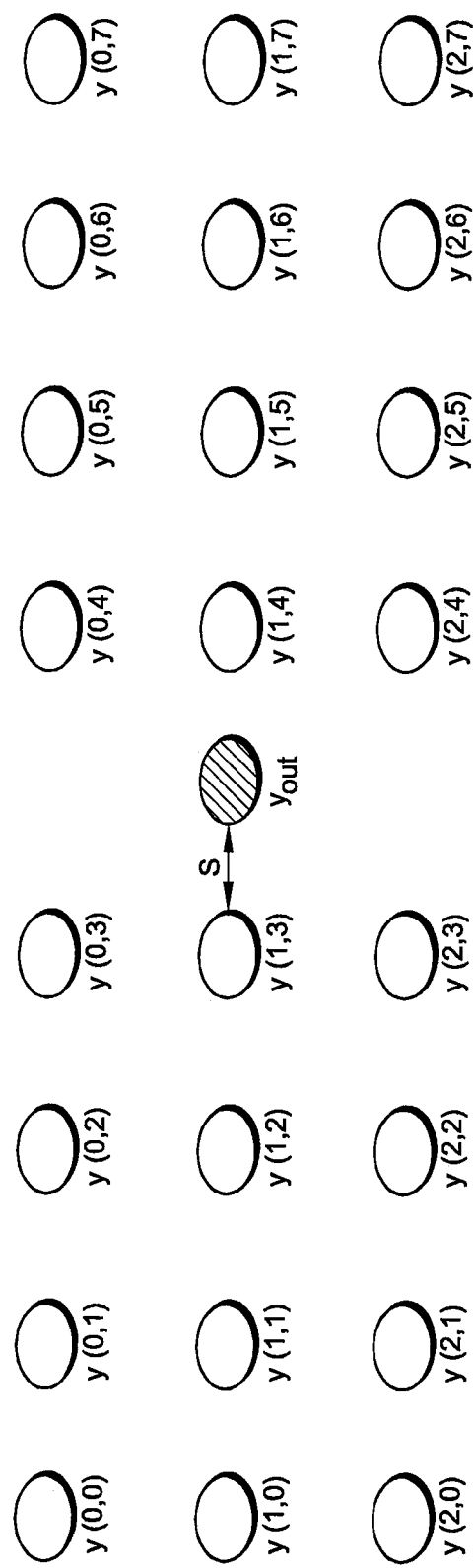
FIG. 9 shows the relative indexing of the data used in the invention's formulas for the row-wise stage of interpolation.

To explain the details of the operations of the processes 502, 503 and 504, the relative indexing shown in FIG. 9 is adopted to avoid using confusing generalized indexes. FIG. 9 assumes the data array is being interpolated in the row-wise interpolation stage. For the embodiment in which the horizontal interpolation stage is performed first, all three rows are from the initial input data array. For the embodiment in which the horizontal interpolation stage is performed after the column-wise interpolation stage, the rows may be either from the initial input data array, or may be a row of interpolated values created by the first stage. It is clear to a person of ordinary skill in the art how the relative indexing is to be modified for the column-wise interpolation stage; and how to adapt the indexing for an arbitrary interpolation location. The purpose is to explain the methods used to calculate the current stage's interpolation value $y_{out}$ at the interpolation location between y(1,3) and y(1,4).

Figure 10:
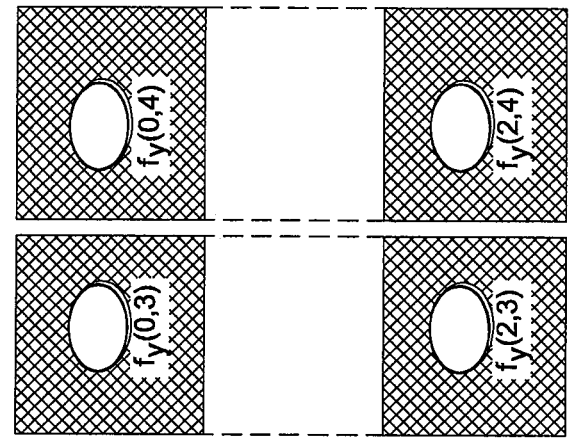
FIG. 10 shows the subset of the data of FIG. 9 that is used in the 2D Data Analysis calculation 502.
Figure 10:
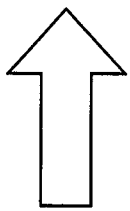
Figure 10:
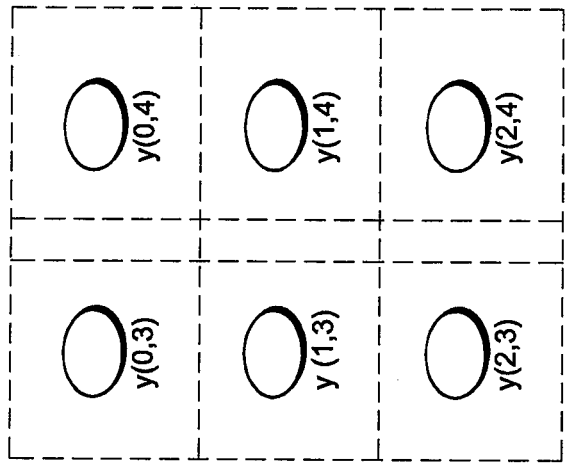

FIG. 10 shows the subset of the data of FIG. 9 that is used by the 2D Data Analysis process 502. This process calculates four new values diagonally about the interpolation location, and helps control image quality at corners after resealing. The values are found, in one embodiment, by the following: $f_y(m, n) = y(m,n)*(1.0-\sigma)+y(1,n)*\sigma$, for $m \in \{0,2\}$, $n \in \{3,4\}$, where, $\sigma = |y(m,n)-y(1,n)|/T_\sigma$, and by using fine-tune parameters $KT_\sigma$ and $S_{offset}$ to find $T_\sigma = S_{offset} + KT_\sigma*(|y(0,3)-y(0,4)|+2*|y(1,3)-y(1,4)|+|y(2,3)-y(2,4)|)/16$. The parameter $S_{offset}$ adjusts the outputs to have greater robustness to noise. The parameter $KT_\sigma$ adjusts the outputs so they are better adapted for edges, when the original 2D array is an image data array. The values of $S_{offset}$ are limited to [0,255]. The values of $KT_\sigma$ are limited to [0,32].

The previous embodiment for the outputs of the 2D Data Analysis process 502 typically involves floating point (or double precision) divisions and multiplications. As this could require more processing time than desired, in another embodiment the values of the $f_y$ are calculated by the following piecewise-defined function, in which $T_\sigma$ is calculated as in the previous paragraph, and the output is from the first case (reading down) that is true:

$$fy(m, n)|_{\substack{m \in (0,2) \\ n \in (3,4)}} = \begin{cases} y(1, n) & |y(m, n) - y(1, n)| > T_\sigma \\ (3*y(1, n) + y(m, n))/4 & |y(m, n) - y(1, n)| > 3*T_\sigma/4 \\ (y(1, n) + y(m, n))/2 & |y(m, n) - y(1, n)| > T_\sigma/2 \\ (y(1, n) + 3*y(m, n))/4 & |y(m, n) - y(1, n)| > T_\sigma/4 \\ y(m, n) & \text{else} \end{cases}$$

Figure 6:
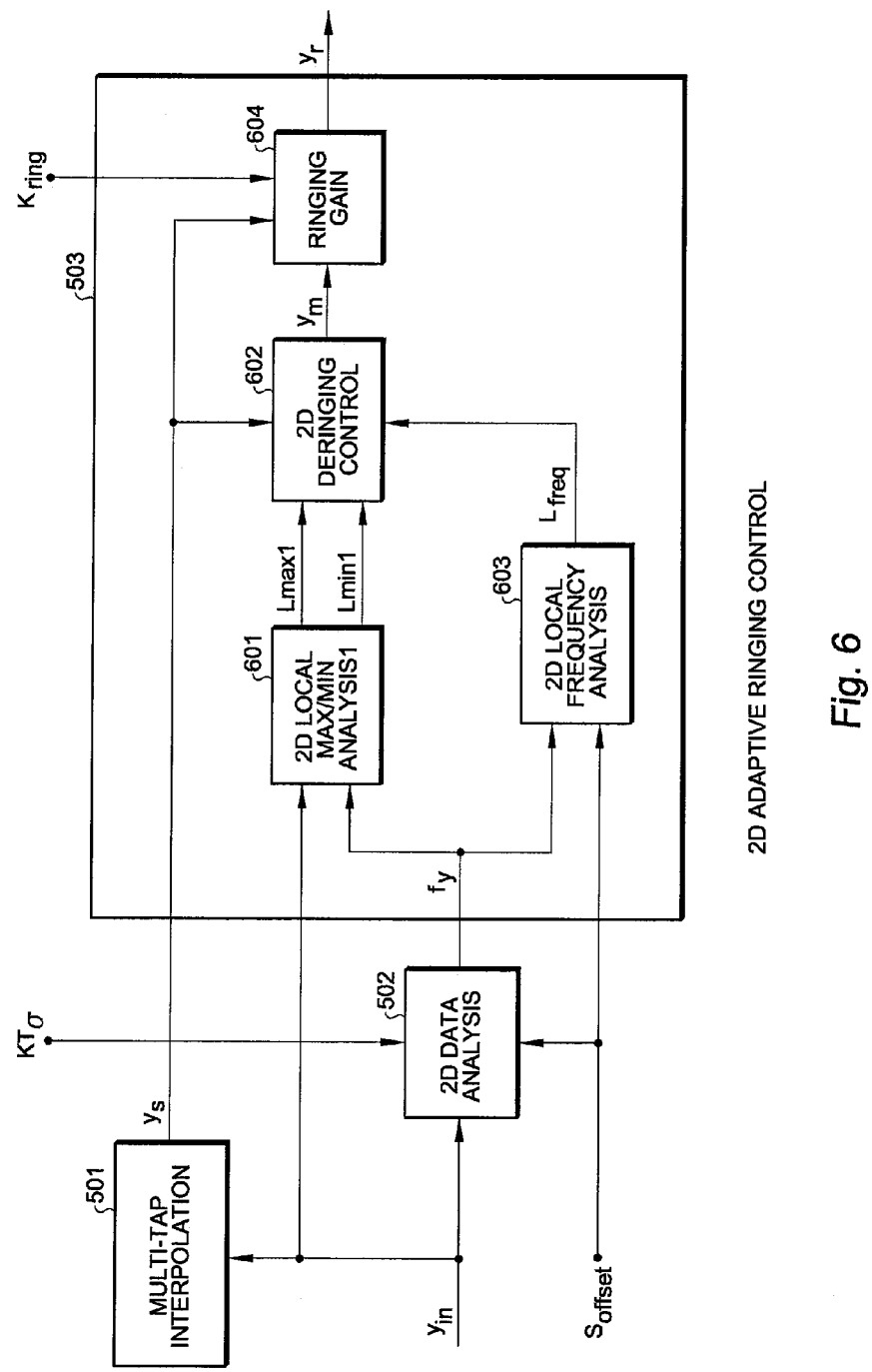
FIG. 6 shows the preferred embodiment of the 2D Adaptive ringing control.
Figure 7:
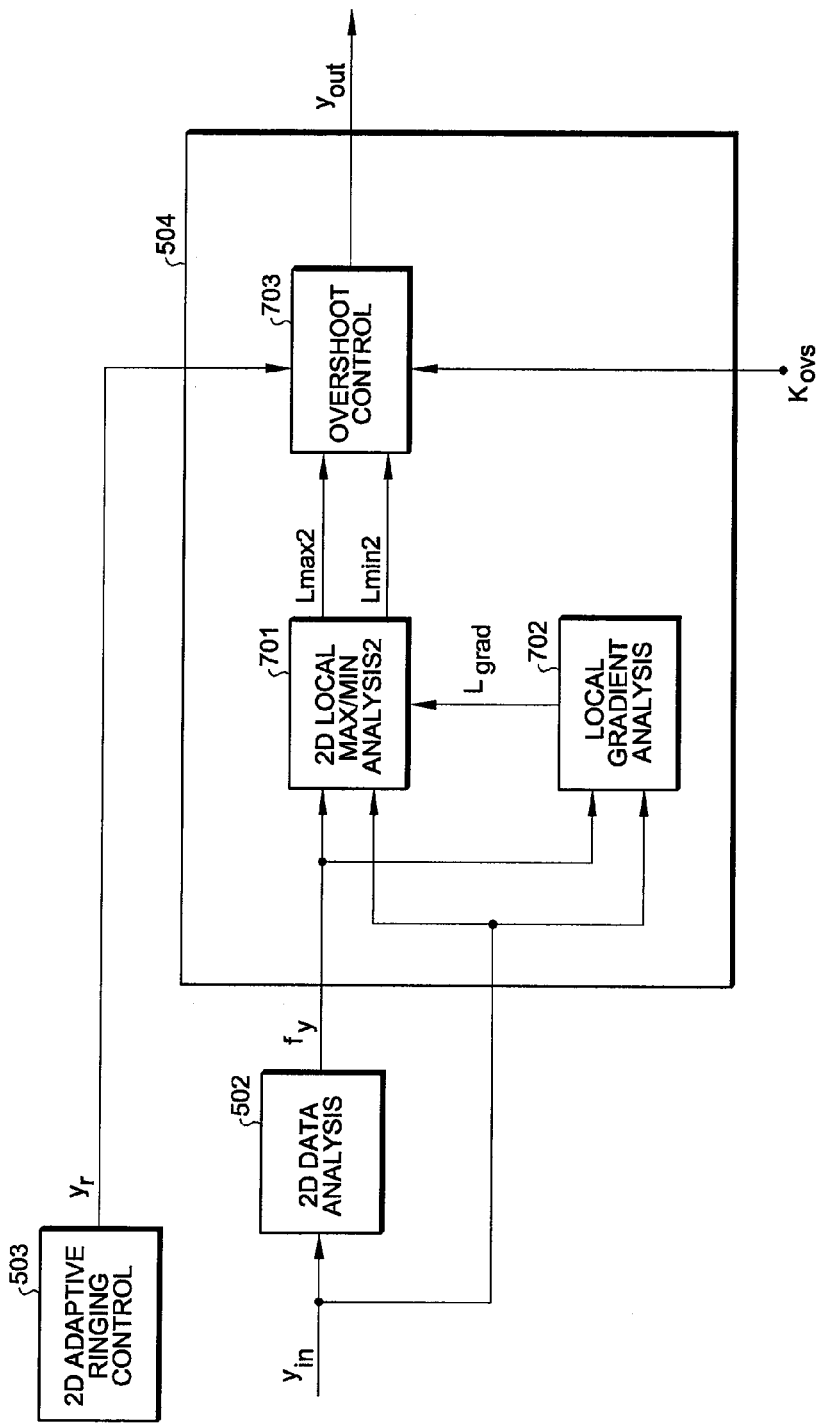
FIG. 7 shows the preferred embodiment of the 2D adaptive overshoot control.

The 2D Adaptive Ringing Control process 503 uses several inputs: the values of the Multi-tap Interpolation 501 process, $y_s$, the current stage's input array, $y_{in}$, and the values of the 2D Data Analysis calculation 502, $f_y$. Used with these data inputs are two of the user-input parameters: $K_{ring}$ and $S_{offset}$. The 2D Adaptive Ringing Control process 503 comprises various internal processes: a 2D Local Frequency Analysis calculation 603 in parallel with a first 2D Local Max/Min Analysis1 calculation 601, as shown in FIG. 6. Their results are combined with the results, $y_s$, of the Multi-tap Interpolation 501 in a 2D Deringing Control calculation 602, which produces an estimate, $y_m$, for the desired interpolation value. The value of $y_m$ is then used, with the values of $y_s$, by a Ringing Gain process 604 to calculate the interpolation value $y_r$, which is the output of the 2D Adaptive Ringing Control process 503. The details of these internal processes are explained below. Depending on the embodiment, $y_r$ is either the stage's final output interpolation value, or else $y_r$ is used as an input to a subsequent 2D Adaptive Overshoot Control process 505.

The 2D Local Max/min Analysis1 601 process is used to discriminate the larger and smaller value of a pair of values according to the calculations:

$$Lmax1=\max(y_{in}(1,3),y_{in}(1,4),fy(0,3),fy(0,4),fy(2,3),fy(2,4));$$

$$Lmin1=\min(y_{in}(1,3),y_{in}(1,4),fy(0,3),fy(0,4),fy(2,3),fy(2,4));$$

Figure 11:
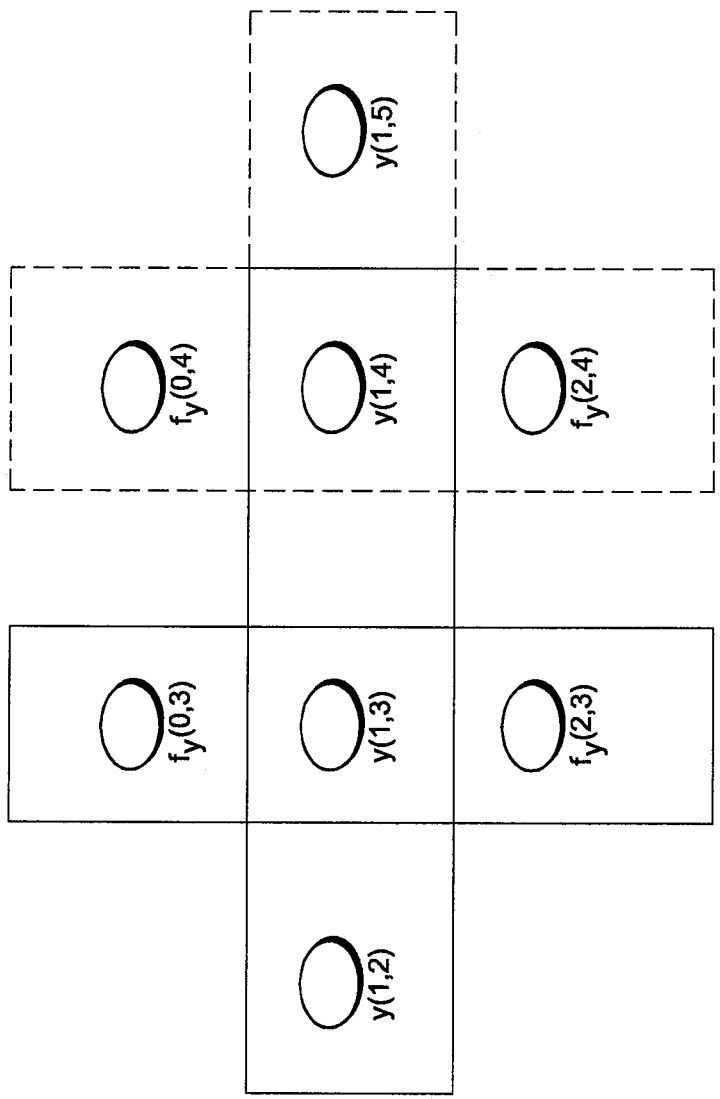
FIG. 11 shows the subset of the data of FIGS. 9 and 10 that is used in the 2D Local Frequency calculation 603.

The 2D Local Frequency Analysis 603 uses the data values indicated in FIG. 11 to calculate its output value, Lfreq, that is related to the local frequency. In some embodiments, the local feature is estimated, for example, using the equations below.

$$L_{freq}=(\max(mlap1,mlap2)-S_{offset})/K_1$$

where mlap1 and mlap2 are defined as shown in the equations below:

$$mlap1 = \left| \begin{array}{c} fy(0,3) \\ +y(1,2)-4\times y(1,3)+y(1,4)+ \\ fy(2,3) \end{array} \right|$$

$$mlap2 = \left| \begin{array}{c} fy(0,4) \\ +y(1,3)-4\times y(1,4)+y(1,5)+ \\ fy(2,4) \end{array} \right|,$$

and $K_1$ is a constant value used to normalize $L_{freq}$ so that $L_{freq}$ is in the range [0, 1].

2D Deringing Control 602 next calculates $y_m$ from the following.

$$y_m = \begin{cases} Lmax1+((ys-Lmax1)\times L_{freq}) & \text{if } (ys>Lmax1) \\ Lmin1+((ys-Lmin1)\times L_{freq}) & \text{if } (ys>Lmin1) \\ ys & \text{else} \end{cases}$$

Finally, the Ringing Gain process 604 calculates $y_r$ from the following.

$$y_r=(K_{ring}\times(y_s-y_m))+y_m$$

The values of $K_{ring}\in[0,1]$, and for $K_{ring}=1$, then $y_r=y_s$, and thus no ringing control is applied at all.

The 2D Adaptive Overshoot Control 504 process uses, in the dual control embodiment, the results of 2D Adaptive Ringing Control 503 and the outputs of the 2D Data Analysis 502. In an alternate embodiment in which only 2D Adaptive Overshoot Control is used in the current stage, as shown in FIG. 19, the values produced by the Multi-tap Interpolation 501 are used in lieu of the outputs of the 2D Adaptive Ringing Control process 503. Used with these data inputs is user-input parameter $K_{ovs}$.

Local Gradient Analysis 702 calculates the local gradient value Lgrad. In some embodiments, the local gradient value is estimated, for example, using the following calculations.

$$Lgrad=\min(|y(1,2)-y(1,3)|,|y(1,3)-y(1,4)|)/K_2.$$

$K_2$ is a constant value chosen to normalize Lgrad so that Lgrad is in the range [0, 1].

The 2D Adaptive Overshoot Control has a Local Max/min Analysis2 process, 701. This process calculates the larger and smaller values of a pair of values, Lmax2 and Lmin2, using the input data y and the output, $f_y$, of the 2D Data analysis process 502. The calculation of the Lmax2 and Lmin2 is controlled by the local gradient value, $L_{grad}$. The result is that overshoot control is better adapted for edges. An exemplary calculation is implemented by the equations below:

$$Lmax2=\max(Lmax,fy(0,3),fy(0,4),fy(2,3),fy(2,4));$$

$$Lmin2=\min(Lmin,fy(0,3),fy(0,4),fy(2,3),fy(2,4)),$$

where $$Lmax=\max(y(1,3),y(1,4))\times(1-L_{grad})+\max(y(1,0),\ldots y(1,7))\times L_{grad}$$

$$Lmin=\min(y(1,3),y(1,4))\times(1-L_{grad})+\min(y(1,0),\ldots y(1,7))\times L_{grad}$$

Overshoot Control process 703 calculates interpolation stage's output, $y_{out}$, by using (i) the user-defined input $K_{ovs}$, (ii) the two values Lmax2 and Lmin2 from Local Max/Min analysis2 701, and (ii) either the output of the 2D Adaptive Ringing Control, $y_r$, in the embodiment in which a stage that uses both ringing and overshoot control, or the outputs of the Multi-tap Interpolation $y_s$ in the embodiment in which only overshoot control is applied. The following function performs the calculation; for the case of only overshoot control, $y_r$ is replaced by $y_s$.

$$y_{out} = \begin{cases} Lmax2+((y_r-Lmax2)\times K_{ovs}) & \text{if } (y_r>Lmax2) \\ Lmin2+((y_r-Lmin2)\times K_{ovs}) & \text{if } (y_r<Lmin2) \\ y_r & \text{else} \end{cases}$$

The values of $K_{ovs}\in[0,1]$, and for $K_{ovs}=1$, then $y_{out}=y_r$, and thus no overshoot control is applied at all.

Once both column-wise and row-wise interpolation stages have been performed, if necessary any unnecessary or undesired O-padding or data extension values in the final output array may be cropped in a final step. The result is a new 2D array containing the interpolation values. For the case that the original 2D array contained a selection of an image, the result represents an enlargement or compression of the image, or it could represent a change in the color value.

Depending on the extent of interpolation required, the entire sequence of steps of the method can be iteratively applied to obtain the wanted or needed number of interpolated values. For image data, repetition of the entire interpolation process may be used to obtain any needed magnification.

An alternate embodiment applies only a one-stage interpolation process to the initial input data array. The single stage can alternatively be either the column-wise interpolation process of Multi-tap interpolation, followed by 2D Adaptive Ringing Control and/or 2D Adaptive Overshoot Control, or it could be the row-wise interpolation process, comprising the same two substages. It is clear to one of ordinary skill in the art that a two-stage interpolation process previously described can be implemented as an iteration of a single one-stage interpolation process, in which a transpose operation is applied to an array at one point, in order to achieve both a column-wise and a row-wise interpolation.

In other embodiments of the invention in which the process is applied iteratively, it is clear that, on each iteration, the user can choose to apply both of the 2D Adaptive Ringing Control and the 2D Adaptive Overshoot Control processes, or to apply only one.

The various embodiments presented can easily be implemented through coding either of a general purpose computer or a specialized processor based computer, or applied in dedicated hardware, for example on field programmable gate arrays, or on application specific integrated circuits.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for interpolation of a 2-dimensional (2D) data array comprising:
    applying an initiation process, comprising the operations of:
    (i) accessing a selected part of the 2D data array,
    (ii) accessing information on whether the interpolation is to be performed row-wise or column-wise, and
    (iii) accessing information giving locations at which to calculate interpolation values, to obtain an initial input data array;
    accessing input control parameters $S_{offset}$, $K_{ring}$ and $KT_\sigma$; and
    applying an interpolation process on said initial input data array, using said accessed information, to create an output array of interpolation values;
    wherein the interpolation process comprises the operations of applying an initial Multi-tap Interpolation Process, applying a 2D Data Analysis Process that uses $S_{offset}$ and $KT_\sigma$, and applying a 2D Adaptive Ringing Control process;
    wherein the 2D Adaptive Ringing Control process uses input variables $K_{ring}$, the values of the initial input data array, the results of the multi-tap interpolation and the results of the 2D Data Analysis process to create interpolation values for the output array; and
    wherein the method is practiced in an integrated circuit.

2. The method of claim 1, wherein the initiation process further comprises expanding the selected part of the data array for further operations.

3. The method of claim 1, wherein the 2D data array contains image data.

4. The method of claim 1, wherein the Multi-tap Interpolation Process applies a polyphase interpolation filter of the form $$y_s(i, m) = \sum_{k=m+N/2}^{m-\frac{N}{2}+1} f(s; m-k+N/2) * y(i, k),$$

to produce its outputs $y_s(i,m)$, or the column direction equivalent form, wherein the number of taps N can be adjusted, and s represents the phase, and can be used to adjust the tap weights.

5. The method of claim 1, wherein the 2D Data Analysis Process, for an interpolation location, being between $y(1,3)$ and $y(1,4)$ in exemplary and relative indexing, and with y substituting for $y_{in}$, uses the input 2D array's values $y(0,3)$, $y(0,4)$, $y(1,3)$, $y(1,4)$, $y(2,3)$ and $y(2,4)$ to calculate output values, $f_y(0,3)$, $f_y(0,4)$, $f_y(2,3)$ and $f_y(2,4)$, by the rules: $f_y(m,n)=y(m,n)*(1.0-\sigma)+y(1,n)*\sigma$, for m∈{0,2}, n∈{3,4}, where $\sigma=|y(m,n)-y(1,n)|/T_\sigma$, and, for user adjusted parameters $KT_\sigma$ and $S_{offset}$, $T_\sigma=S_{offset}+KT_\sigma*(|y(0,3)-y(0,4)|+2*|y(1,3)-y(1,4)|+|y(2,3)-y(2,4)|)/16$, and wherein $KT_\sigma$ is in the range [0,32], and $S_{offset}$ is in the range [0,255].

6. The method of claim 1, wherein the 2D Data Analysis Process, for the interpolation location between $y(1,3)$ and $y(1,4)$ in exemplary and relative indexing, and with y substituting for $y_{in}$, uses the input 2D array's values $y(0,3)$, $y(0,4)$, $y(1,3)$, $y(1,4)$, $y(2,3)$ and $y(2,4)$ to calculate output values, $f_y(0,3)$, $f_y(0,4)$, $f_y(2,3)$ and $f_y(2,4)$, by the rule, according to the first true condition reading down:

$$fy(m, n)|_{\substack{m\in(0,2)\\n\in(3,4)}} = \begin{cases} y(1, n) & |y(m,n)-y(1,n)| > Tsigma \\ (3*y(1,n)+y(m,n))/4 & |y(m,n)-y(1,n)| > 3*Tsigma/4 \\ (y(1,n)+y(m,n))/2 & |y(m,n)-y(1,n)| > Tsigma/2 \\ (y(1,n)+3*y(m,n))/4 & |y(m,n)-y(1,n)| > Tsigma/4 \\ y(m,n) & \text{else} \end{cases}$$

wherein for user adjusted parameters $KT_\sigma$ and $S_{offset}$, $T_\sigma=S_{offset}+KT_\sigma*(|y(0,3)-y(0,4)|+2*|y(1,3)\ y(1,4)|+|y(2,3)-y(2,4)|)/16$, and wherein $KT_\sigma$ is in the range [0,32], and $S_{offset}$ is in the range [0,255].

7. The method of claim 5, wherein the 2D Adaptive Ringing Control Process calculates an output interpolation value $y_r$, having interpolation location between $y(1,3)$ and $y(1,4)$ in exemplary and relative indexing, by using the values of input 2D data array $y(0,0) \ldots y(0,8)$, $y(1,0), \ldots, y(1,8)$, $y(2,0), \ldots, y(2,8)$; user-controlled parameters $k_{ring}$ and $S_{offset}$; the output of the Multi-tap Interpolation $y_s$; and the output of the 2D Data Analysis, $f_y(0,3)$, $f_y(0,4)$, $f_y(2,3)$ and $f_y(2,4)$; by applying a 2D Local Max/min Analysis1 to calculate Lmax1 and Lmin1 by the formulas:

$Lmax1=\max(y(1,3),y(1,4),fy(0,3),fy(0,4),fy(2,3),fy(2,4));$ $Lmin1=\min(y(1,3),y(1,4),fy(0,3),fy(0,4),fy(2,3),fy(2,4));$ by applying a 2D Local Frequency Analysis to calculate a value $L_{freq}$ by the formulas $L_{freq}=(\max(mlap1, mlap2)-S_{offset})/K_1$ where mlap1 and mlap2 are defined in the equations:

$$mlap1 = \begin{vmatrix} fy(0,3) + \\ y(1,2) - 4 \times y(1,3) + y(1,4) + \\ fy(2,3) \end{vmatrix}$$

$$mlap2 = \begin{vmatrix} fy(0,4) + \\ y(1,3) - 4 \times y(1,4) + y(1,5) + \\ fy(2,4) \end{vmatrix},$$

and where $K_1$ is a constant value used to normalize $L_{freq}$ so that $L_{freq}$ is in the range [0,1];
by applying a 2D Deringing Control to calculate a value $y_m$ by the rule $$y_m = \begin{cases} Lmax1 + ((ys - Lmax1) \times L_{freq}) & \text{if } (ys > Lmax1) \\ Lmin1 + ((ys - Lmin1) \times L_{freq}) & \text{if } (ys > Lmin1) \\ ys & \text{else} \end{cases}$$

and by applying a Ringing Gain Process to calculate the output $y_r$ by the rule $y_r=(K_{ring}\times(y_s-y_m))+y_m,$ wherein the values of $K_{ring}\in[0,1]$.

8. The method of claim 6, wherein the 2D Adaptive Ringing Control Process calculates an output interpolation value $y_r$, having interpolation location between $y(1,3)$ and $y(1,4)$ in exemplary and relative indexing, by using the values of the input 2D data array $y(0,0) \ldots y(0,8)$, $y(1,0), \ldots, y(1,8)$, y(2,0), ..., y(2,8); user-controlled parameters $K_{ring}$ and $S_{offset}$; the output of the Multi-tap Interpolation $y_s$; and the output of the 2D Data Analysis, $f_y(0,3)$, $f_y(0,4)$, $f_y(2,3)$ and $f_y(2,4)$; by applying a 2D Local Max/min Analysis1 to calculate Lmax1 and Lmin1 by the formulas:

$$L\max1=\max(y(1,3),y(1,4),fy(0,3),fy(0,4),fy(2,3),fy(2,4));$$

$$L\min1=\min(y(1,3),y(1,4),fy(0,3),fy(0,4),fy(2,3),fy(2,4));$$

by applying a 2D Local Frequency Analysis to calculate a value $L_{freq}$ by the formulas $$L_{freq}=(\max(m\text{lap}1,m\text{lap}2)-S_{offset})/K_1$$

where mlap1 and mlap 2 are defined in the equations:

$$m\text{lap}1 = \begin{vmatrix} fy(0,3) + \\ y(1,2) - 4 \times y(1,3) + y(1,4) + \\ fy(2,3) \end{vmatrix}$$

$$m\text{lap}2 = \begin{vmatrix} fy(0,4) + \\ y(1,3) - 4 \times y(1,4) + y(1,5) + \\ fy(2,4) \end{vmatrix},$$

and where $K_1$ is a constant value used to normalize $L_{freq}$ so that $L_{freq}$ is in the range [0,1];

by applying a 2D Deringing Control to calculate a value $y_m$ by the rule $$y_m = \begin{cases} L\max1 + ((ys - L\max1) \times L_{freq}) & \text{if } (ys > L\max1) \\ L\min1 + ((ys - L\min1) \times L_{freq}) & \text{if } (ys > L\min1) \\ ys & \text{else} \end{cases}$$

and by applying a Ringing Gain Process to calculate the output $y_r$ by the rule $$y_r = (K_{ring} \times (y_s - y_m)) y_m,$$

wherein the values of $K_{ring} \in [0,1]$.

9. The method of claim 1 further comprising the processes of combining the interpolation outputs of claim 1 with the initial input data array, and reapplying the process of claim 1 to the combined array but in the alternative direction of interpolation.

10. The method of claim 1, wherein the interpolation process further comprises a 2D Adaptive Overshoot Control process that uses the outputs of the 2D Adaptive Ringing Control process, $y_r$, the outputs of the 2D Data Analysis, the initial input data array, and an input parameter $K_{ovs}$, to produce the output interpolation values; and wherein the 2D Adaptive Overshoot Control process comprises a 2D Local Max/min Analysis2 process, a Local Gradient Analysis process and an Overshoot Control process.

11. The method of claim 10, wherein the 2D Adaptive Overshoot Control process calculates the interpolation output value $y_{out}$, with interpolation location between y(1,3) and y(1,4) in relative indexing, by applying a Local Gradient Analysis process to calculate a value $L_{grad}$ by the rule $L_{grad}=\min(|y(1,2)-y(1,3)|, |y(1,3)-y(1,4)|)/K_2$, wherein $K_2$ is a constant value chosen to normalize Lgrad so that Lgrad is in the range [0,1]; by applying a 2D Local Max/min Analysis2 process to calculate values Lmax2 and Lmin2 by the rules $$L\max2=\max(L\max,fy(0,3),fy(0,4),fy(2,3),fy(2,4));$$

$$L\min2=\min(L\min,fy(0,3),fy(0,4),fy(2,3),fy(2,4)),$$

where $$L\max=\max(y(1,3),y(1,4)) \times (1-L_{grad}) + \max(y(1,0), \ldots y(1,7)) \times L_{grad}$$

$$L\min=\min(y(1,3),y(1,4)) \times (1-L_{grad}) + \min(y(1,0), \ldots y(1,7)) \times L_{grad};$$

and by applying an Overshoot Control process to calculate $y_{out}$ by the rule $$y_{out} = \begin{cases} L\max2 + ((y_r - L\max2) \times K_{ovs}) & \text{if } (y_r > L\max2) \\ L\min2 + ((y_r - L\min2) \times K_{ovs}) & \text{if } (y_r < L\min2) \\ y_r & \text{else} \end{cases}$$

wherein the value of $K_{ovs} \in [0,1]$.

12. The method of claim 10 further comprising the processes of combining the interpolation outputs of claim 10 with the initial input data array, and reapplying the process of claim 10 to the combined array but in the alternative direction of interpolation.

13. A method for interpolation of a 2-dimensional (2D) data array comprising:

applying an initiation process, comprising the operations of:

(i) accessing a selected part of the 2D data array, (ii) accessing information on whether the interpolation is to be performed row-wise or column-wise, and (iii) accessing information giving locations at which to calculate interpolation values, to obtain an initial input data array;

accessing input control parameters $S_{offset}$, $KT_\sigma$ and $K_{ovs}$; and applying an interpolation process on said initial input data array, using said accessed information, to create an output array of interpolation values;

wherein the interpolation process comprises the operations of applying an initial Multi-tap Interpolation Process, applying a 2D Data Analysis Process that uses $S_{offset}$ and $KT_\sigma$, and applying a 2D Adaptive Overshoot Control process;

wherein the 2D Adaptive Overshoot Control process uses input variables $K_{ovs}$, the values of the initial input data array, the results of the multi-tap interpolation and the results of the 2D Data Analysis process to create interpolation values for the output array; and wherein the method is practiced in an integrated circuit.

14. The method of claim 13, wherein the 2D data array contains image data.

15. The method of claim 13, wherein the initiation process further comprises expanding the selected part of the data array for further operations.

16. The method of claim 13, wherein the Multi-tap Interpolation Process applies a polyphase interpolation filter of the form $$y_s(i, m) = \sum_{k=m+N/2}^{m-\frac{N}{2}+1} f(s; m-k+N/2) * y(i, k),$$

to produce its outputs $y_s(i,m)$, or the column direction equivalent form, wherein the number of taps N can be adjusted, and s represents the phase, and can be used to adjust the tap weights.

17. The method of claim 13, wherein the 2D Data Analysis Process, for an interpolation location between y(1,3) and y(1,4) in exemplary and relative indexing, and with y substituting for $y_{in}$, uses the input 2D array's values y(0,3), y(0,4), y(1,3), y(1,4), y(2,3) and y(2,4) to calculate output values, $f_y(0,3), f_y(0,4), f_y(2,3)$ and $f_y(2,4)$, by the rules: $f_y(m,n)=y(m,n)*(1.0-\sigma)+y(1,n)*\sigma$, for m∈{0,2}, n∈{3,4}, where σ=|y(m,n)−y(1,n)|/$T_\sigma$, and, for user adjusted parameters $KT_\sigma$ and $S_{offset}$, $T_\sigma=S_{offset}+KT_\sigma*(|y(0,3)−y(0,4)|+2*|y(1,3)−y(1,4)|+|y(2,3)−y(2,4)|)/16$, and wherein $KT_\sigma$ is in the range [0,32], and $S_{offset}$ is in the range [0,255].

18. The method of claim 13, wherein the 2D Data Analysis Process, for the interpolation location being between y(1,3) and y(1,4) in relative indexing, and with y substituting for $y_{in}$, uses the input 2D array's values y(0,3), y(0,4), y(1,3), y(1,4), y(2,3) and y(2,4) to calculate output values, $f_y(0,3), f_y(0,4), f_y(2,3)$ and $f_y(2,4)$, by the rule, according to the first true condition reading down:

$$fy(m, n)|_{\substack{m\in(0,2)\\n\in(3,4)}} = \begin{cases} y(1,n) & |y(m,n)-y(1,n)| > Tsigma \\ (3*y(1,n)+y(m,n))/4 & |y(m,n)-y(1,n)| > 3*Tsigma/4 \\ (y(1,n)+y(m,n))/2 & |y(m,n)-y(1,n)| > Tsigma/2 \\ (y(1,n)+3*y(m,n))/4 & |y(m,n)-y(1,n)| > Tsigma/4 \\ y(m,n) & \text{else} \end{cases}$$

19. The method of claim 17, wherein the 2D Adaptive Overshoot Control process calculates an output interpolation value $y_{out}$, having interpolation location between y(1,3) and y(1,4) in exemplary and relative indexing, by using the values of the input 2D data array y(0,0)...y(0,8), y(1,0),...,y(1,8), y(2,0),...,y(2,8); user-controlled parameter $K_{ovs}$; the output of the Multi-tap Interpolation $y_s$; and the output of the 2D Data Analysis, $f_y(0,3), f_y(0,4), f_y(2,3)$ and $f_y(2,4)$; by applying a Local Gradient Analysis to calculate a value $L_{grad}$ by the rule $Lgrad=\min(|y(1,2)−y(1,3)|,|y(1,3)−y(1,4)|)/K_2$ where $K_2$ is a constant value chosen to normalize Lgrad so that Lgrad is in the range [0,1]; by applying a 2D Local Max/min Analysis2 to calculate Lmax2 and Lmin2 by the formulas:

$Lmax2=\max(Lmax,fy(0,3),fy(0,4),fy(2,3),fy(2,4))$;

$Lmin2=\min(Lmin,fy(0,3),fy(0,4),fy(2,3),fy(2,4))$, where $Lmax=\max(y(1,3),y(1,4))\times(1−L_{grad})+\max(y(1,0),\ldots y(1,7))\times L_{grad}$ $Lmin=\min(y(1,3),y(1,4))\times(1−L_{grad})+\min(y(1,0),\ldots y(1,7))\times L_{grad}$;

and by applying an Overshoot Control process to calculate the interpolation output $y_{out}$ by the rule $$y_{out} = \begin{cases} Lmax2 + ((y_r - Lmax2) \times K_{ovs}) & \text{if } (y_r > Lmax2) \\ Lmin2 + ((y_r - Lmin2) \times K_{ovs}) & \text{if } (y_r < Lmin2) \\ y_r & \text{else} \end{cases}$$

wherein the value of $K_{ovs}\in[0,1]$.

20. The method of claim 18, wherein the 2D Adaptive Overshoot Control process calculates an output interpolation value $y_{out}$, having interpolation location between y(1,3) and y(1,4) in exemplary and relative indexing, by using the values of the input 2D data array y(0,0)...y(0,8), y(1,0),...,y(1,8), y(2,0),...,y(2,8); user-controlled parameter $K_{ova}$; the output of the Multi-tap Interpolation $y_s$; and the output of the 2D Data Analysis, $f_y(0,3), f_y(0,4), f_y(2,3)$ and $f_y(2,4)$; by applying a Local Gradient Analysis to calculate a value $L_{grad}$ by the rule $Lgrad \min(|y(1,2)−y(1,3)|,|y(1,3)−y(1,4)|)/K_2$ where $K_2$ is a constant value chosen to normalize Lgrad so that Lgrad is in the range [0,1];
by applying a 2D Local Max/min Analysis2 to calculate Lmax2 and Lmin2 by the formulas:

$Lmax2=\max(Lmax,fy(0,3),fy(0,4),fy(2,3),fy(2,4))$;

$Lmin2=\min(Lmin,fy(0,3),fy(0,4),fy(2,3),fy(2,4))$, where $Lmax=\max(y(1,3),y(1,4))\times(1−L_{grad})+\max(y(1,0),\ldots y(1,7))\times L_{grad}$ $Lmin=\min(y(1,3),y(1,4))\times(1−L_{grad})+\min(y(1,0),\ldots y(1,7))\times L_{grad}$;

and by applying an Overshoot Control process to calculate the interpolation output $y_{out}$ by the rule $$y_{out} = \begin{cases} Lmax2 + ((y_r - Lmax2) \times K_{ovs}) & \text{if } (y_r > Lmax2) \\ Lmin2 + ((y_r - Lmin2) \times K_{ovs}) & \text{if } (y_r < Lmin2) \\ y_r & \text{else} \end{cases}$$

wherein the value of $K_{ovs}\in[0,1]$.

21. The method of claim 13, further comprising the processes of combining the interpolation outputs of claim 13 with the initial input data array, and reapplying the process of claim 13 to the combined array but in the alternative direction of interpolation.

22. A system operative to produce interpolation values for a 2-dimensional (2D) data array comprising:
an input module, configured to receive inputs and to produce an initial input data array for further processing, by implementing a set of operations comprising:

(i) accessing a selected part of the 2D data array, (ii) accessing information on whether the interpolation is to be performed row-wise or column-wise, (iii) accessing information giving locations at which to calculate interpolation values, and (iv) accessing a set of input control parameters comprising $S_{offset}$, $K_{ring}$, $K_{ovs}$, and $KT_\sigma$; and a calculation module operable to receive said initial input data array and to perform a set of interpolation processes on said initial input data array, using said accessed information, to create an output array of interpolation values;

wherein the calculation module calculates output interpolation values by the operations of an initial Multi-tap Interpolation Process, applying a 2D Data Analysis Process that uses $KT_\sigma$ and $S_{offset}$, and applying one of: a 2D Adaptive Ringing Control process followed by a 2D Adaptive Overshoot Control process, a 2D Adaptive Ringing Control process by itself, and a 2D Adaptive Overshoot Control process;

wherein the 2D Adaptive Ringing Control process uses input variable $K_{ring}$, the values of the initial input data array, the results of the multi-tap interpolation and the results of the 2D Data Analysis process, wherein the 2D Adaptive Overshoot Control process, when applied by itself, uses input variable $K_{ovs}$, the values of the initial input data array, the results of the multi-tap interpolation and the results of the 2D Data Analysis process; and wherein the 2D Adaptive Overshoot Control process, when applied after the 2D Adaptive Ringing Control process, uses input variable $K_{ovs}$, the values of the initial input data array, the results of the multi-tap interpolation and the results of the 2D Adaptive Ringing Control process; and wherein the system is implemented in an integrated circuit.

23. The system of claim 22 wherein the Multi-tap Interpolation Process applies a polyphase interpolation filter of the form $$y_s(i,m) = \sum_{k=m+N/2}^{m-\frac{N}{2}+1} f(s; m-k+N/2) * y(i,k),$$

to produce its outputs $y_s(i,m)$, or the column direction equivalent form, wherein the number of taps N can be adjusted, and s represents the phase, and can be used to adjust the tap weights.

24. The method of claim 22, wherein the 2D Data Analysis Process, for an interpolation location, being between y(1,3) and y(1,4) in exemplary and relative indexing, and with y substituting for $y_{in}$, uses the input 2D array's values y(0,3), y(0,4), y(1,3), y(1,4), y(2,3) and y(2,4) to calculate output values, $f_y(0,3)$, $f_y(0,4)$, $f_y(2,3)$ and $f_y(2,4)$, by either a first sequence of calculations: $f_y(m,n)=y(m,n)*(1.0-\sigma)+y(1,n)*\sigma$, for m∈{0,2}, n∈{3,4}, where $\sigma=|y(m,n)-y(1,n)|/T_\sigma$, and, for user adjusted parameters $KT_\sigma$ and $S_{offset}$, $T_\sigma=S_{offset}+KT_\sigma*(|y(0,3)-y(0,4)|+2*|y(1,3)-y(1,4)|+|y(2,3)-y(2,4)|)/16$, and wherein $KT_\sigma$ is in the range [0,32], and $S_{offset}$ is in the range [0,255]; or by a second sequence of calculations: for user adjusted parameters $KT_\sigma$ and $S_{offset}$, $T_\sigma=S_{offset}+KT_\sigma*(|y(0,3)-y(0,4)|+2*|y(1,3)-y(1,4)|+|y(2,3)-y(2,4)|)/16$, and choosing according to the first true condition reading down:

$$fy(m,n)|_{\substack{m\in(0,2)\\n\in(3,4)}} = \begin{cases} y(1,n) & |y(m,n)-y(1,n)| > Tsigma \\ (3*y(1,n)+y(m,n))/4 & |y(m,n)-y(1,n)| > 3*Tsigma/4 \\ (y(1,n)+y(m,n))/2 & |y(m,n)-y(1,n)| > Tsigma/2 \\ (y(1,n)+3*y(m,n))/4 & |y(m,n)-y(1,n)| > Tsigma/4 \\ y(m,n) & \text{else} \end{cases}$$

wherein for user adjusted parameters $KT_\sigma$ and $S_{offset}$, $KT_\sigma$ is in the range [0,32], and $S_{offset}$ is in the range [0,255].

25. The system of claim 24, wherein the 2D Adaptive Ringing Control Process calculates an output interpolation value $y_r$, having interpolation location between y(1,3) and y(1,4) in exemplary and relative indexing, by using the values of the input 2D data array y(0,0) . . . y(0,8), y(1,0), . . . , y(1,8), y(2,0), . . . , y(2,8); user-controlled parameters $K_{ring}$ and $S_{offset}$; the output of the Multi-tap Interpolation $y_s$; and the output of the 2D Data Analysis, $f_y(0,3)$, $f_y(0,4)$, $f_y(2,3)$ and $f_y(2,4)$; by applying a 2D Local Max/min Analysis1 to calculate Lmax1 and Lmin1 by the formulas:

Lmax1=max(y(1,3),y(1,4),fy(0,3),fy(0,4),fy(2,3),fy(2,4));

Lmin1=min(y(1,3),y(1,4),fy(0,3),fy(0,4),fy(2,3),fy(2,4));

by applying a 2D Local Frequency Analysis to calculate a value $L_{freq}$ by the formulas $L_{freq}$=(max(mlap1,mlap2)−$S_{offset}$)/$K_1$ where mlap1 and mlap 2 are defined in the equations:

$$mlap1 = \begin{vmatrix} fy(0,3) + \\ y(1,2) - 4 \times y(1,3) + y(1,4) + \\ fy(2,3) \end{vmatrix}$$

$$mlap2 = \begin{vmatrix} fy(0,4) + \\ y(1,3) - 4 \times y(1,4) + y(1,5) + \\ fy(2,4) \end{vmatrix},$$

and where $K_1$ is a constant value used to normalize $L_{freq}$ so that $L_{freq}$ is in the range [0,1];

by applying a 2D Deringing Control to calculate a value $y_m$ by the rule $$y_m = \begin{cases} Lmax1 + ((ys - Lmax1) \times L_{freq}) & \text{if } (ys > Lmax1) \\ Lmin1 + ((ys - Lmin1) \times L_{freq}) & \text{if } (ys > Lmin1) \\ ys & \text{else} \end{cases}$$

and by applying a Ringing Gain Process to calculate the output $y_r$ by the rule $y_r=(K_{ring}\times(y_s-y_m))+y_m$, wherein the values of $K_{ring}\in[0,1]$.

26. The system of claim 24 wherein the 2D Adaptive Overshoot Control process calculates an output interpolation value $y_{out}$, having interpolation location between y(1,3) and y(1,4) in exemplary and relative indexing, by using the values of the input 2D data array y(0,0) . . . y(0,8), y(1,0), . . . , y(1,8), y(2,0), . . . , y(2,8); user-controlled parameter $K_{ovs}$; the output of the Multi-tap Interpolation $y_s$; and the output of the 2D Data Analysis, $f_y(0,3)$, $f_y(0,4)$, $f_y(2,3)$ and $f_y(2,4)$; by applying a Local Gradient Analysis to calculate a value $L_{grad}$ by the rule Lgrad=min(|y(1,2)−y(1,3)|, |y(1,3)−y(1,4)|)/$K_2$ where $K_2$ is a constant value chosen to normalize Lgrad so that Lgrad is in the range [0,1];

by applying a 2D Local Max/min Analysis2 to calculate Lmax2 and Lmin2 by the formulas:

$Lmax2 = max(Lmax, fy(0,3), fy(0,4), fy(2,3), fy(2,4));$ $Lmin2 = min(Lmin, fy(0,3), fy(0,4), fy(2,3), fy(2,4)),$ where $Lmax = max(y(1,3), y(1,4)) \times (1 - L_{grad}) + max(y(1,0), \ldots y(1,7)) \times L_{grad}$ $Lmin = min(y(1,3), y(1,4)) \times (1 - L_{grad}) + min(y(1,0), \ldots y(1,7)) \times L_{grad};$ and by applying an Overshoot Control process to calculate the interpolation output Your by the rule $$y_{out} = \begin{cases} Lmax2 + ((y_r - Lmax2) \times K_{ovs}) & \text{if } (y_r > Lmax2) \\ Lmin2 + ((y_r - Lmin2) \times K_{ovs}) & \text{if } (y_r < Lmin2) \\ y_r & \text{else} \end{cases}$$

wherein the value of $K_{ovs} \in [0,1]$.

27. The system of claim 25, further comprising a 2D Adaptive Overshoot Control process calculates the interpolation output value $y_{out}$, with interpolation location between y(1,3) and y(1,4) in relative indexing, by: using the results of the 2D Adaptive Ringing Control process $y_r$, the initial input data array, and the results 2D Data Analysis Process; by applying a Local Gradient Analysis process to calculate a value $L_{grad}$ by the rule Lgrad=min(|y(1,2)−y(1,3)|, |y(1,3)−y(1,4)|)/$K_2$, wherein $K_2$ is a constant value chosen to normalize Lgrad so that Lgrad is in the range [0,1]; by applying a 2D Local Max/min Analysis2 process to calculate values Lmax2 and Lmin2 by the rules $Lmax2 = max(Lmax, fy(0,3), fy(0,4), fy(2,3), fy(2,4));$ $Lmin2 = min(Lmin, fy(0,3), fy(0,4), fy(2,3), fy(2,4)),$ where $Lmax = max(y(1,3), y(1,4)) \times (1 - L_{grad}) + max(y(1,0), \ldots y(1,7)) \times L_{grad};$ $Lmin = min(y(1,3), y(1,4)) \times (1 - L_{grad}) + min(y(1,0), \ldots y(1,7)) \times L_{grad};$ and by applying an Overshoot Control process to calculate $y_{out}$ by the rule $$y_{out} = \begin{cases} Lmax2 + ((y_r - Lmax2) \times K_{ovs}) & \text{if } (y_r > Lmax2) \\ Lmin2 + ((y_r - Lmin2) \times K_{ovs}) & \text{if } (y_r < Lmin2) \\ y_r & \text{else} \end{cases}$$

wherein the value of $K_{ovs} \in [0,1]$.

* * * * *

UNITED STATES PATENT AND TRADEMARK OFFICE
CERTIFICATE OF CORRECTION

PATENT NO. : 8,682,111 B2
APPLICATION NO. : 13/489240
DATED : March 25, 2014
INVENTOR(S) : Yong Huang and Lucas Hui It is certified that error appears in the above-identified patent and that said Letters Patent is hereby corrected as shown below:

In the Claims

Column 12, line 12, Claim 6 " $2 * |y(1,3)\ y(1,4)|$ " should be -- $2 * |y(1,3) - y(1,4)|$ --

Column 12, line 38, Claim 7 "
$$mlap1 = \left| y(1,2) - 4 \times \begin{matrix} fy(0,3) + \\ y(1,3) \\ fy(2,3) \end{matrix} + y(1,4) + \right|$$
$$mlap2 = \left| y(1,3) - 4 \times \begin{matrix} fy(0,4) + \\ y(1,4) \\ fy(2,4) \end{matrix} + y(1,5) + \right|,$$
"
should be
$$mlap1 = \left| +y(1,2) - 4 \times \begin{matrix} fy(0,3) \\ y(1,3) \\ fy(2,3) \end{matrix} + y(1,4) + \right|$$
$$mlap2 = \left| +y(1,3) - 4 \times \begin{matrix} fy(0,4) \\ y(1,4) \\ fy(2,4) \end{matrix} + y(1,5) + \right|,$$
--

Column 14, line 3, Claim 11 " $Lmax2 = max(Lmax, fy(0,3), fy(0,4), fy(2,3), fy(2,4)),$ "
should be -- $Lmax2 = max(Lmax, fy(0,3), fy(0,4), fy(2,3), fy(2,4)), and$ --

Signed and Sealed this
Twelfth Day of August, 2014

Michelle K. Lee
*Deputy Director of the United States Patent and Trademark Office*

CERTIFICATE OF CORRECTION (continued)
U.S. Pat. No. 8,682,111 B2

Column 16, line 23, Claim 19 "$K_{ova}$" should be --$K_{ovs}$--

Column 19, line 11, Claim 26

" $Lmax = \max(y(1,3), y(1,4)) \times (1 - L_{grad}) + \max(y(1,0), ... y(l,7)) \times L_{grad}$ "

should be

-- $Lmax = \max(y(1,3), y(1,4)) \times (1 - L_{grad}) + \max(y(1,0), ... y(1,7)) \times L_{grad}$ --

Column 19, line 17, Claim 26 "Your" should be --$y_{out}$--

Column 20, line 9, Claim 27 " $Lmax2 = \max(Lmax, fy(0,3), fy(0,4), fy(2,3), fy(2,4));$ "

should be

-- $Lmax2 = \max(Lmax, fy(0,3), fy(0,4), fy(2,3), fy(2,4));$ and --